United States Patent
Akao et al.

(10) Patent No.: US 6,962,145 B2
(45) Date of Patent: Nov. 8, 2005

(54) FAILURE DETECTION APPARATUS FOR AN INTERNAL COMBUSTION ENGINE

(75) Inventors: Yoshiyuki Akao, Yokohama (JP); Susumu Kohketsu, Tokyo (JP)

(73) Assignee: Mitsubishi Fuso Truck and Bus Corporation (JP)

( * ) Notice: Subject to any disclaimer, the term of this patent is extended or adjusted under 35 U.S.C. 154(b) by 101 days.

(21) Appl. No.: 10/655,5784

(22) Filed: Jun. 4, 2004

(65) Prior Publication Data

US 2004/0206074 A1 Oct. 21, 2004

(30) Foreign Application Priority Data

Sep. 6, 2002 (JP) .................................. 2002-261611

(51) Int. Cl.[7] .............................................. F02D 41/00

(52) U.S. Cl. .................................. 123/672; 123/568.11

(58) Field of Search ................................ 123/672, 676, 123/568.11, 434

(56) References Cited

U.S. PATENT DOCUMENTS 4,870,942 A * 10/1989 Shibata et al. ............... 123/676
6,227,181 B1 * 5/2001 Suzuki .................. 123/568.15

FOREIGN PATENT DOCUMENTS

JP 10-18897 1/1998

* cited by examiner

*Primary Examiner*—Bibhu Mohanty
(74) *Attorney, Agent, or Firm*—Rossi & Associates

(57) ABSTRACT

A failure detection apparatus for an internal combustion engine includes failure detecting means (S22–S30) for detecting abnormality of fresh air quantity detecting means (air flow sensor) based on the result of comparison between a fresh air quantity detected by the fresh air quantity detecting means (air flow sensor) and a fresh air quantity reference value set by fresh air quantity reference value setting means (S20), and exhaust flow rate adjusting means. The fresh air quantity reference value setting means sets the reference value (S16) in accordance with not only the operating state (engine speed $N_e$, fuel injection quantity $Q_f$, etc.) of the engine but also a target adjustment amount (target throttle valve opening) set for the exhaust flow rate adjusting means by target adjustment setting means (S12, S14).

20 Claims, 7 Drawing Sheets

FAILURE DETECTION APPARATUS FOR AN INTERNAL COMBUSTION ENGINE

BACKGROUND OF THE INVENTION

1. Field of the Invention

The present invention relates to a failure detection apparatus for an internal combustion engine, and more particularly, to techniques enabling reliable detection of abnormality in an air flow sensor.

2. Description of the Related Art

Recently, in order to prevent harmful exhaust gas from being emitted from an engine mounted on a motor vehicle, various control means are used to improve exhaust gas characteristics. These control means operate based on information supplied from various sensors and the like, to improve the exhaust gas characteristics.

If any of the sensors etc. falls, however, the exhaust gas characteristics may possibly be deteriorated, and accordingly, there has been a demand for reliable detection of failure of such sensors etc. Recently, vehicles equipped with an on-board diagnostic system (OBD etc.) have been developed and put to practical use, with a view to further improving the exhaust gas characteristics.

Information from the various sensors etc., especially, information from an air flow sensor (AFS) is used for many purposes including the control of an after-treatment device, EGR or exhaust gas recirculation, etc., and failure of the air flow sensor greatly affects the exhaust gas characteristics. Accordingly, diagnosis of the air flow sensor is of especial importance.

Thus, an apparatus has been proposed in which, when the rotation speed of the engine is lower than or equal to a predetermined value and at the same time an intake air quantity detected by the air flow sensor is higher than or equal to a predetermined value, for example, the air flow sensor is judged to be abnormal (see Japanese Patent Application Publication No. H10-018897, for example).

In such diagnosis of the air flow sensor, failure of the sensor is usually determined by comparing a reference value set in advance based on operating conditions, such as engine speed, fuel injection quantity, engine torque, throttle opening (throttle valve opening), manifold air pressure, etc., with an output value from the air flow sensor.

However, in the case where the flow rate of exhaust gas is adjusted by an exhaust flow control valve arranged in the intake or exhaust system to promote purification of the exhaust gas or where EGR gas is introduced into the intake system while the exhaust flow rate is adjusted, the quantity of fresh air varies depending on the opening of the exhaust flow control valve or EGR valve, giving rise to a problem that failure of the air flow sensor cannot be determined with accuracy.

To solve the problem, the diagnosis of the air flow sensor may be suspended while the opening of the exhaust flow control valve or EGR valve varies, for example. In the apparatus disclosed in the aforementioned publication, for example, the diagnosis of the air flow sensor as to abnormality is prohibited when the engine is in a cold state in which the engine is supplied with bypass air.

Such suspension of the diagnosis is, however, not desirable because it leads to a substantial reduction in the period for diagnosing the air flow sensor.

SUMMARY OF THE INVENTION

The present invention was created to solve the above problems, and an object thereof is to provide a failure detection apparatus for an internal combustion engine which is capable of reliable detection of abnormality in an air flow sensor irrespective of exhaust flow rate control.

To achieve the object, a failure detection apparatus according to the present invention comprises: fresh air quantity detecting means arranged in an intake system of an internal combustion engine, for detecting a quantity of fresh air introduced into a combustion chamber of the engine; fresh air quantity reference value setting means for setting a reference value for the fresh air quantity in accordance with an operating state of the engine; failure detecting means for detecting abnormality of the fresh air quantity detecting means, based on a result of comparison between the fresh air quantity detected by the fresh air quantity detecting means and the reference value set by the fresh air quantity reference value setting means; exhaust flow rate adjusting means arranged in at least one of the intake system and exhaust system of the engine, for adjusting an exhaust flow rate; target adjustment setting means for setting a target adjustment amount for the exhaust flow rate adjusting means in accordance with the operating state of the engine such that an air-fuel ratio or excess air ratio of the exhaust system becomes equal to a predetermined value corresponding to the operating state; and exhaust flow rate control means for controlling the exhaust flow rate adjusting means in accordance with the target adjustment amount set by the target adjustment setting means, wherein the fresh air quantity reference value setting means sets the reference value in accordance with not only the operating state of the engine but also the target adjustment amount set for the exhaust flow rate adjusting means by the target adjustment setting means.

Thus, the reference value for the fresh air quantity is set by the fresh air quantity reference value setting means in accordance with the operating state (engine speed, fuel injection quantity engine torque, throttle opening, manifold air pressure, etc.) of the engine, and based on the result of comparison between the thus-set reference value and the fresh air quantity detected by the fresh air quantity detecting means, abnormality or failure of the fresh air quantity detecting means (air flow sensor) is detected. In this case, the fresh air quantity reference value setting means sets the reference value in accordance with not only the operating state of the engine but also the target adjustment amount set for the exhaust flow rate adjusting means by the target adjustment setting means.

Accordingly, the reference value for the fresh air quantity can be set taking account of the target adjustment amount, that is, the amount of exhaust flow rate adjusted by the exhaust flow rate adjusting means. Proper and reliable diagnosis of the fresh air quantity detecting means can therefore be carried out, irrespective of the adjustment of exhaust flow rate for promoting exhaust gas purification, whereby reliability of the fresh air quantity detecting means can be enhanced, making it possible to further improve the exhaust gas characteristics.

In the failure detection apparatus according to the present invention, the exhaust flow rate adjusting means may include at least one of an intake throttle valve arranged in the intake system for adjusting the fresh air quantity and an exhaust throttle valve arranged in the exhaust system for directly adjusting the exhaust flow rate. The fresh air quantity reference value setting means sets the reference value in accordance with not only the operating state of the engine but also a target valve opening set for said at least one of the intake and exhaust throttle valves by the target adjustment setting means.

Thus, the fresh air quantity reference value setting means sets the reference value in accordance with not only the operating state of the engine but also the target valve opening set for the intake and exhaust throttle valves by the target adjustment setting means.

Accordingly, the reference value for the fresh air quantity can be set taking account of the target valve opening, that is, the amount of exhaust flow rate adjusted by the intake and exhaust throttle valves. Proper and reliable diagnosis of the fresh air quantity detecting means can therefore be carried out, irrespective of the adjustment of exhaust flow rate for promoting exhaust gas purification, whereby reliability of the fresh air quantity detecting means can be enhanced.

The failure detection apparatus of the present invention may further comprise exhaust concentration detecting means for detecting an exhaust concentration to thereby detect the air-fuel ratio or excess air ratio of the exhaust system, wherein the fresh air quantity reference value setting means corrects the target adjustment amount for the exhaust flow rate adjusting means, based on a difference between the air-fuel ratio or excess air ratio of the exhaust system, detected by the exhaust concentration detecting means, and the predetermined value, and sets the reference value based on the corrected target adjustment amount.

Specifically, the target adjustment amount for the exhaust flow rate adjusting means is a command value which is set in accordance with the operating state (engine speed, fuel injection quantity, etc.) of the engine such that the air-fuel ratio or excess air ratio of the exhaust system becomes equal to the predetermined value corresponding to the operating state, and the target adjustment amount may possibly be different from an actual adjustment amount. Accordingly, the target adjustment amount for the exhaust flow rate adjusting means is corrected based on the difference between the air-fuel ratio or excess air ratio of the exhaust system, detected by the exhaust concentration detecting means, and the predetermined value, and the reference value is set based on the corrected target adjustment amount.

Consequently, the reference value for the fresh air quantity can be set to a proper value matching the actual adjustment amount for the exhaust flow rate adjusting means, and the fresh air quantity detecting means can be diagnosed with higher accuracy during the adjustment of the exhaust flow rate, whereby the reliability of the fresh air quantity detecting means can be further improved.

The failure detection apparatus of the present invention may further comprise exhaust concentration detecting means for detecting an exhaust concentration to thereby detect the air-fuel ratio or excess air ratio of the exhaust system, wherein the exhaust flow rate control means corrects an amount of adjustment by the exhaust flow rate adjusting means such that the air-fuel ratio or excess air ratio of the exhaust system, detected by the exhaust concentration detecting means, coincides with the predetermined value.

As mentioned above, the target adjustment amount for the exhaust flow rate adjusting means may possibly be different from an actual adjustment amount, and therefore, the amount of adjustment by the exhaust flow rate adjusting means is corrected such that the air-fuel ratio or excess air ratio of the exhaust system, detected by the exhaust concentration detecting means, coincides with the predetermined value.

Accordingly, the reference value for the fresh air quantity can be set to a proper value matching the actual amount of adjustment by the exhaust flow rate adjusting means, whereby the fresh air quantity detecting means can be diagnosed with higher accuracy during the adjustment of the exhaust flow rate, making it possible to further improve the reliability of the fresh air quantity detecting means.

The failure detection apparatus of the present invention may further comprise exhaust concentration detecting means for detecting an exhaust concentration to thereby detect the air-fuel ratio or excess air ratio of the exhaust system, wherein, when the air-fuel ratio or excess air ratio of the exhaust system, detected by the exhaust concentration detecting means, is different from the predetermined value, the fresh air quantity reference value setting means suspends the control of the exhaust flow rate adjusting means by the exhaust flow rate control means and sets the reference value based solely on the operating state of the engine.

The target adjustment amount for the exhaust flow rate adjusting means may possibly be different from an actual adjustment amount, as mentioned above, and therefore, when the air-fuel ratio or excess air ratio of the exhaust system, detected by the exhaust concentration detecting means, is different from the predetermined value, the control of the exhaust flow rate adjusting means is suspended.

In this case, the reference value for the fresh air quantity is set based solely on the operating state of the engine, to enhance the accuracy of diagnosis of the fresh air quantity detecting means without reducing the occasion for diagnosis, whereby the reliability of the fresh air quantity detecting means can be further improved.

According to another aspect of the present invention, a failure detection apparatus comprises: fresh air quantity detecting means arranged in an intake system of an internal combustion engine, for detecting a quantity of fresh air introduced into a combustion chamber of the engine; fresh air quantity reference value setting means for setting a reference value for the fresh air quantity in accordance with an operating state of the engine; failure detecting means for detecting abnormality of the fresh air quantity detecting means, based on a result of comparison between the fresh air quantity detected by the fresh air quantity detecting means and the reference value set by the fresh air quantity reference value setting means; exhaust flow rate adjusting means arranged in one of the intake system and exhaust system of the engine, for adjusting an exhaust flow rate; target adjustment setting means for setting a target adjustment amount for the exhaust flow rate adjusting means in accordance with the operating state of the engine such that an air-fuel ratio or excess air ratio of the exhaust system becomes equal to a predetermined value corresponding to the operating state; exhaust flow rate control means for controlling the exhaust flow rate adjusting means in accordance with the target adjustment amount set by the target adjustment setting means; an EGR passage for allowing part of exhaust gas to be recirculated from the exhaust system of the engine to the intake system as EGR gas; an EGR valve inserted in the EGR passage, for controlling a quantity of the EGR gas by varying an opening thereof; target opening setting means for setting a target EGR valve opening for the EGR valve in accordance with the operating state of the engine such that the air-fuel ratio or excess air ratio of the exhaust system becomes equal to the predetermined value; and EGR valve control means for controlling the EGR valve in accordance with the target EGR valve opening set by the target opening setting means, wherein the fresh air quantity reference value setting means sets the reference value in accordance with not only the operating state of the engine but also the target adjustment amount set for the exhaust flow rate adjusting means by the target adjustment setting means and the target EGR valve opening set by the target opening setting means.

Thus, the reference value for the fresh air quantity is set by the fresh air quantity reference value setting means in accordance with the operating state (engine speed, fuel injection quantity, engine torque, throttle opening., manifold air pressure, etc.) of the engine, and based on the result of comparison between the thus-set reference value and the fresh air quantity detected by the fresh air quantity detecting means, abnormality or failure of the fresh air quantity detecting means (air flow sensor) is detected. In this case, the fresh air quantity reference value setting means sets the reference value in accordance with not only the operating state of the engine but also the target adjustment amount set for the exhaust flow rate adjusting means by the target adjustment setting means and the target EGR valve opening set by the target opening setting means.

Accordingly, the reference value for the fresh air quantity can be set taking account of the target adjustment amount, that is, the amount of exhaust flow rate adjusted by the exhaust flow rate adjusting means, and the target EGR valve opening, that is, the EGR gas quantity. Proper and reliable diagnosis of the fresh air quantity detecting means can therefore be carried out, irrespective of the adjustment of exhaust flow rate or the introduction of EGR gas for promoting exhaust gas purification, whereby reliability of the fresh air quantity detecting means can be enhanced, making it possible to further improve the exhaust gas characteristics.

In the failure detection apparatus of the present invention, the exhaust flow rate adjusting means may include at least one of an intake throttle valve arranged in the intake system for adjusting the fresh air quantity and an exhaust throttle valve arranged in the exhaust system for directly adjusting the exhaust flow rate. The fresh air quantity reference value setting means sets the reference value in accordance with not only the operating state of the engine but also a target valve opening set for said at least one of the intake and exhaust throttle valves by the target adjustment setting means and the target EGR valve opening set by the target opening setting means.

Thus, the fresh air quantity reference value setting means sets the reference value in accordance with not only the operating state of the engine but also the target valve opening set for the intake and exhaust throttle valves by the target adjustment setting means and the target EGR valve opening set by the target opening setting means.

Accordingly, the reference value for the fresh air quantity can be set taking account of the target valve opening, that is, the amount of exhaust flow rate adjusted by the intake and exhaust throttle valves, as well as the target EGR valve opening, that is, the EGR gas quantity. Proper and reliable diagnosis of the fresh air quantity detecting means can therefore be carried out, irrespective of the adjustment of exhaust flow rate or the introduction of EGR gas for promoting exhaust gas purification, whereby reliability of the fresh air quantity detecting means can be enhanced.

The failure detection apparatus of the present invention may further comprise exhaust concentration detecting means for detecting an exhaust concentration to thereby detect the air-fuel ratio or excess air ratio of the exhaust system, wherein the fresh air quantity reference value setting means corrects at least one of the target adjustment amount and the target EGR valve opening based on a difference between the air-fuel ratio or excess air ratio of the exhaust system, detected by the exhaust concentration detecting means, and the predetermined value, and sets the reference value based on said at least one of the corrected target adjustment amount and the corrected target EGR valve opening.

Specifically, the target adjustment amount for the exhaust flow rate adjusting means or the target EGR valve opening for the EGR valve is a command value which is set in accordance with the operating state (engine speed, fuel injection quantity, etc.) of the engine such that the air-fuel ratio or excess air ratio of the exhaust system becomes equal to the predetermined value corresponding to the operating state, and may possibly be different from an actual adjustment amount or actual EGR valve opening. Thus, the target adjustment amount for the exhaust flow rate adjusting means and the target EGR valve opening are corrected based on the difference between the air-fuel ratio or excess air ratio of the exhaust system, detected by the exhaust concentration detecting means, and the predetermined value, and the reference value is set based on the corrected target adjustment amount and the corrected target EGR valve opening.

Accordingly, the reference value for the fresh air quantity can be set to a proper value matching the actual adjustment amount of the exhaust flow rate adjusting means and the actual EGR valve opening, and thus the fresh air quantity detecting means can be diagnosed with higher accuracy, further improving the reliability of the fresh air quantity detecting means.

The failure detection apparatus of the present invention may further comprise exhaust concentration detecting means for detecting an exhaust concentration to thereby detect the air-fuel ratio or excess air ratio of the exhaust system, wherein the exhaust flow rate control means corrects an amount of adjustment by the exhaust flow rate adjusting means such that the air-fuel ratio or excess air ratio of the exhaust system, detected by the exhaust concentration detecting means, coincides with the predetermined value, and the EGR valve control means corrects the opening of the EGR valve such that the air-fuel ratio or excess air ratio of the exhaust system, detected by the exhaust concentration detecting means, coincides with the predetermined value.

As mentioned above, the target adjustment amount for the exhaust flow rate adjusting means and the target EGR valve opening for the EGR valve may possibly be different from actual adjustment amount and EGR valve opening, respectively. Thus, the amount of adjustment by the exhaust flow rate adjusting means and the EGR valve opening are corrected such that the air-fuel ratio or excess air ratio of the exhaust system, detected by the exhaust concentration detecting means, coincides with the predetermined value.

Accordingly, the reference value for the fresh air quantity can be set to a proper value matching the actual amount of adjustment by the exhaust flow rate adjusting means and the actual EGR valve opening, and thus the fresh air quantity detecting means can be diagnosed with higher accuracy, further improving the reliability of the fresh air quantity detecting means.

The failure detection apparatus of the present invention may further comprise exhaust concentration detecting means for detecting an exhaust concentration to thereby detect the air-fuel ratio or excess air ratio of the exhaust system, wherein, when the air-fuel ratio or excess air ratio of the exhaust system, detected by the exhaust concentration detecting means, is different from the predetermined value, the fresh air quantity reference value setting means suspends the control of the exhaust flow rate adjusting means by the exhaust flow rate control means as well as the control of the EGR valve by the EGR valve control means and sets the reference value based solely on the operating state of the engine.

The target adjustment amount for the exhaust flow rate adjusting means and the target EGR valve opening for the EGR valve may possibly be different from actual adjustment amount and EGR valve opening, respectively. Thus, when the air-fuel ratio or excess air ratio of the exhaust system, detected by the exhaust concentration detecting means, is different from the predetermined value, the control of the exhaust flow rate adjusting means and the control of the EGR valve are suspended.

In this case, the reference value for the fresh air quantity is set based solely on the operating state of the engine, to enhance the accuracy of diagnosis of the fresh air quantity detecting means without reducing the occasion for diagnosis, whereby the reliability of the fresh air quantity detecting means can be further improved.

A further scope of applicability of the present invention will become apparent from the detailed description given hereinafter. However, it should be understood that the detailed description and specific example, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitative of the present invention, and wherein.

DETAILED DESCRIPTION OF THE PREFERRED EMBODIMENTS

Embodiments of the present invention will be hereinafter described with reference to the accompanying drawings.

Figure 1:
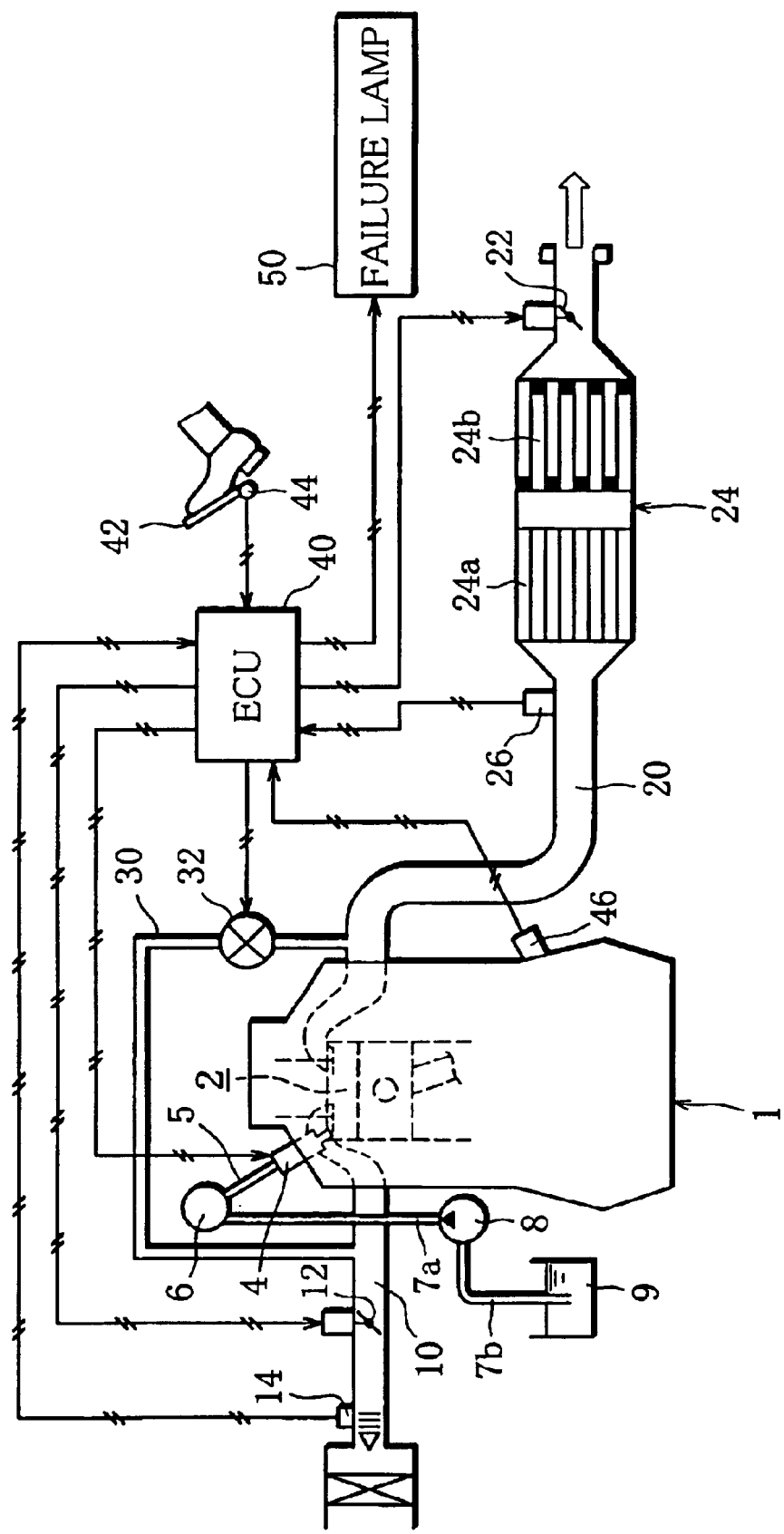
FIG. 1 is a diagram illustrating a schematic arrangement of a failure detection apparatus for an internal combustion engine according to the present invention.

FIG. 1 illustrates a schematic arrangement of a failure detection apparatus for an internal combustion engine according to the present invention. The arrangement of the failure detection apparatus of the present invention will be described first with reference to FIG. 1.

As shown in FIG. 1, an internal combustion engine 1 is a common-rail in-line four-cylinder diesel engine, for example. In the common-rail engine 1, a solenoid-operated fuel injection nozzle 4 is provided for each cylinder so as to face a corresponding combustion chamber 2 and is connected through a high-pressure pipe 5 to a common rail 6. The common rail 6 is connected through a high-pressure pipe 7a to a high-pressure pump 8, which is connected to a fuel tank 9 through a low-pressure pipe 7b. Since the engine 1 is a diesel engine, light oil is used as fuel.

A solenoid-operated intake throttle valve (exhaust flow rate adjusting means) 12 is arranged in an intake passage 10 of the engine 1. On an upstream side of the intake throttle valve 12 is provided an air flow sensor (AFS; fresh air quantity detecting means) 14 for outputting a signal $S_{afs}$ based on which a fresh air quantity $Q_a$ is detected. The intake throttle valve 12 comprises a butterfly valve, for example. Also, in the illustrated engine, a Karman vortex air flow sensor is used as the air flow sensor 14 by way of example, but a hot-wire air flow sensor or the like may be used instead.

An after-treatment device 24 is inserted in an exhaust passage 20. The after-treatment device 24 comprises, for example, a continuously regenerating DPF (diesel particulate filter) including a DPF 24b and an oxidation catalyst 24a arranged on an upstream side of the DPF 24b.

In the continuously regenerating DPF, an oxidizer ($NO_2$) is produced in the oxidation catalyst 24a and is used to continuously remove particulate matter (PM) deposited on the downstream-side DPF 24b by oxidation under a relatively high exhaust gas temperature condition, to thereby regenerate the DPF 24b.

A $\lambda$ sensor ($O_2$ sensor etc.; exhaust concentration detecting means) 26 is arranged at the exhaust passage 20 at a location upstream the after-treatment device 24, to detect an excess air ratio $\lambda$ of the exhaust system through detection of the oxygen concentration of exhaust gas. Instead of detecting the excess air ratio $\lambda$, the air-fuel ratio may be detected, and in this case, an air-fuel ratio sensor (LAFS etc.) is used in place of the $\lambda$ sensor 26.

The exhaust passage 20 is also provided with a solenoid-operated exhaust throttle valve (exhaust flow rate adjusting means) 22. The exhaust throttle valve 22 comprises a butterfly valve, for example, like the intake throttle valve 12, and is operated singly or together with the intake throttle valve 12 to adjust the exhaust flow rate, that is, the exhaust flow velocity, and thereby control the temperature of the exhaust gas in the exhaust passage 20 so that purification of the exhaust gas can be promoted at the cold-start of the engine 1, for example. The exhaust throttle valve 22 also functions as an exhaust brake.

An EGR passage 30 extends from a portion of the exhaust passage 20 near the engine 1, to allow part of the exhaust gas to be recirculated to the intake system as EGR gas. The EGR passage 30 is connected at the other end to a portion of the intake passage 10 located downstream the intake throttle valve 12. A solenoid-operated EGR valve 32 of which the opening can be adjusted to a desired opening is inserted in the EGR passage 30.

An electronic control unit (ECU) 40 is connected at an input side thereof with various sensors which include an accelerator position sensor (APS) 44 for detecting the stroke of an accelerator pedal 42, that is, accelerator position $\theta_{acc}$, and a crank angle sensor 46 for detecting an engine speed $N_e$ through detection of crank angle, besides the air flow sensor 14 and the $\lambda$ sensor 26.

The output side of the ECU 40 is connected with various devices including a failure lamp 50 for indicating a variety of failure statuses, in addition to the fuel injection nozzles 4, intake and exhaust throttle valves 12 and 22, and EGR valve 32.

Based on information input from the various sensors, operations of the various devices are controlled to properly control the operation of the engine 1. For example, based on the information from the accelerator position sensor 44, air flow sensor 14 and λ sensor 26, a fuel injection quantity $Q_f$ as well as the opening of the intake throttle valve 12 are adjusted to control the operation of the engine 1, whereby not only the control of normal engine operation but the regeneration control of the after-treatment device 24, the opening control (exhaust flow rate control means) of the intake and exhaust throttle valves 12 and 22 for promoting exhaust gas purification, and the opening control (EGR valve control means) of the EGR valve 32 are carried out.

Operation of the failure detection apparatus for the engine configured as above will be now described.

A first embodiment will be explained first.

Figure 2:
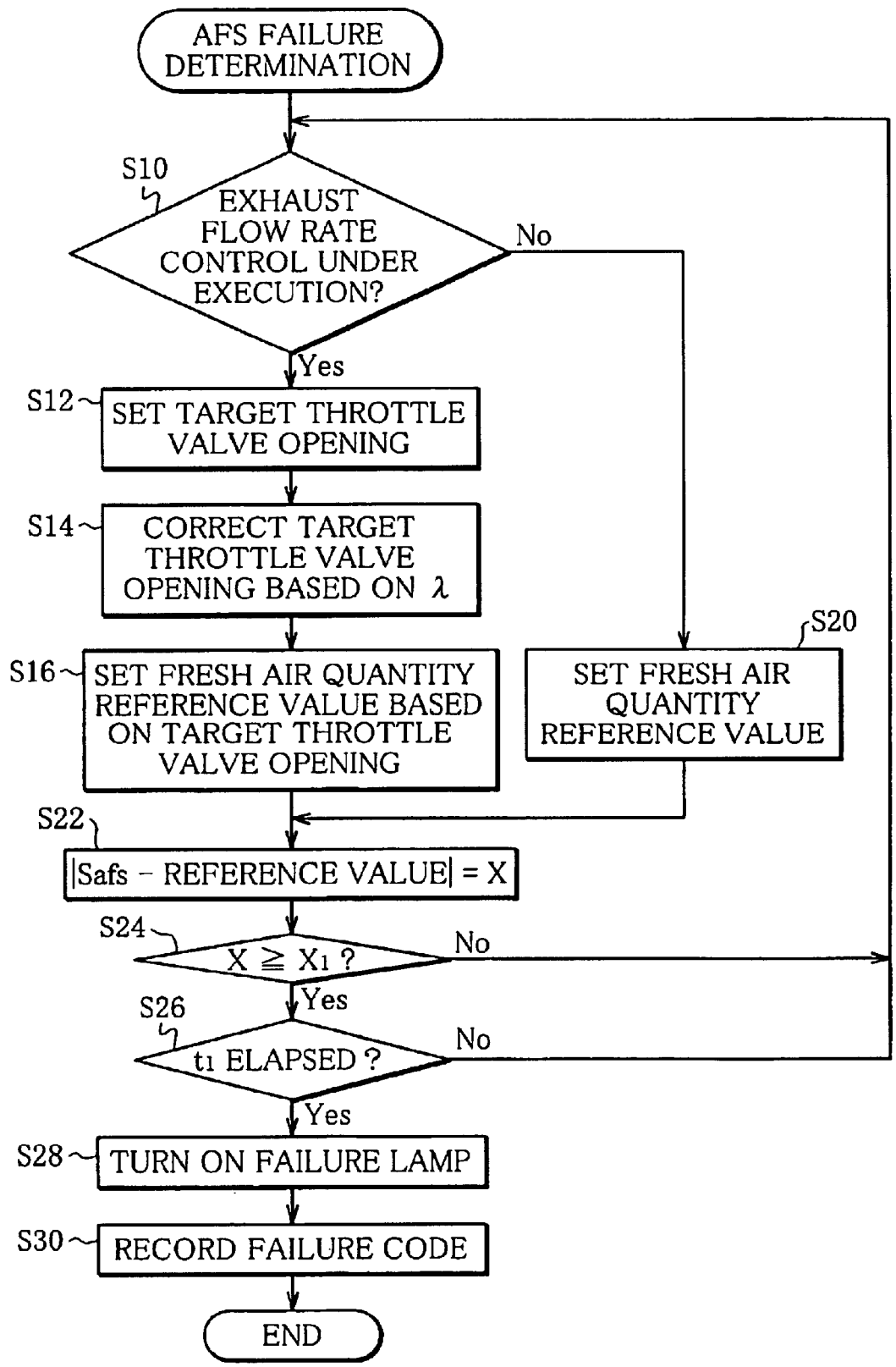
FIG. 2 is a flowchart Illustrating a control routine for air flow sensor (AFS) failure determination according to a first embodiment of the present invention.

FIG. 2 is a flowchart illustrating a control routine for air flow sensor (AFS) failure determination, executed in the failure detection apparatus according to the first embodiment of the present invention. The control routine will be described with reference to the flowchart.

First, in Step S10, it is determined whether or not exhaust flow rate control is under execution, that is, whether or not the exhaust flow rate is being adjusted by controlling the opening of one or both of the intake and exhaust throttle valves 12 and 22 toward the closed position. For example, just after the cold-start of the engine 1, the exhaust gas purifying capability is low, and it is determined in this step whether or not the exhaust flow rate control is executed in such situations to promote exhaust gas purification. If the decision in this step is affirmative (Yes) and thus the exhaust flow rate control is under execution, the routine proceeds to Step S12.

In Step S12 is set a target throttle valve opening for the intake and exhaust throttle valves 12 and 22 as a whole. In this instance, the target throttle valve opening (target adjustment amount, target valve opening) is set (target adjustment setting means) in accordance with the temperature (cooling water temperature etc.) of the engine 1, for example. Usually, a target value (predetermined value) $\lambda_1$ for the excess air ratio λ is set in accordance with the operating state of the engine 1, and as the openings of the intake and exhaust throttle valves 12 and 22 change, the exhaust gas or EGR gas is recirculated into the combustion chamber 2 due to increase in the exhaust pressure, with the result that the excess air ratio λ varies depending on the EGR quantity. Accordingly, the fuel injection quantity $Q_f$ also is controlled in accordance with the target throttle valve opening so that the excess air ratio λ may be kept at the target value $\lambda_1$. In other words, the target throttle valve opening is set while controlling the excess air ratio λ to the target value $\lambda_1$. In practice, a map showing the relationship of the target throttle valve opening with the engine speed $N_e$, fuel injection quantity $Q_f$ and target value $\lambda_1$ is prepared beforehand by experiment, and as soon as the target throttle valve opening is set, an appropriate fuel injection quantity $Q_f$ is read from the map.

In Step S14, the target throttle valve opening set in the aforementioned manner is corrected based on an actual excess air ratio λ detected by the λ sensor 26. The target throttle valve opening is merely a command value from the ECU 40 and is not an actual value. Thus, even if the overall opening of the intake and exhaust throttle valves 12 and 22 is controlled so as to coincide with the target throttle valve opening corresponding to the target value $\lambda_1$, a difference can occasionally arise between the actual overall opening of the intake and exhaust throttle valves 12 and 22 and the target throttle valve opening. Such an opening difference leads to an increased or decreased air quantity, causing a similar difference between the target value $\lambda_1$ and the actual excess air ratio λ. Accordingly, the target value $\lambda_1$ is compared with the actual excess air ratio λ, and based on the result of comparison, the target throttle valve opening is corrected so as to match the actual opening.

Specifically, a difference (absolute value) $|\lambda-\lambda_1|$ between the target value $\lambda_1$ and the actual excess air ratio λ detected by the λ sensor 26 is obtained, and the target throttle valve opening is corrected by an amount corresponding to the difference. The corrected target throttle valve opening obtained in this manner may be stored as a learned value.

Consequently, the target throttle valve opening is corrected to a proper value matching the actual overall opening of the intake and exhaust throttle valves 12 and 22.

In Step S16, a reference value for the fresh air quantity $Q_a$, that is, a fresh air quantity reference value, is set (fresh air quantity reference value setting means) in accordance with the appropriately corrected target throttle valve opening obtained as described above. Basically, the reference value for the fresh air quantity $Q_a$, or the fresh air quantity reference value, is set in accordance with the operating state (engine speed $N_e$, fuel injection quantity $Q_f$, engine torque, throttle valve opening (throttle opening), manifold air pressure, etc.) of the engine 1. In this step, the fresh air quantity reference value thus set is corrected by using the target throttle valve opening. In practice, a map showing the relationship between fresh air quantity $Q_a'$ applicable during the exhaust flow rate control and the target throttle valve opening is prepared beforehand, and an appropriate fresh air quantity $Q_a'$ read from the map is set as the fresh air quantity reference value.

Since the target throttle valve opening has been corrected to a proper value matching the actual overall opening of the intake and exhaust throttle valves 12 and 22, as mentioned above, the fresh air quantity reference value can be set to a highly accurate value as in the case where the exhaust flow rate is not controlled through the adjustment of the intake and exhaust throttle valves 12 and 22.

If the decision in Step S10 is negative (No) and it is judged that the exhaust flow rate control is not under execution, the routine proceeds to Step S20.

In this case, a fresh air quantity $Q_a$, normally obtained in accordance with the operating state of the engine 1 is set directly as the fresh air quantity reference value, without regard to the target throttle valve opening.

In Step S22, a difference (absolute value) $|S_{afs}-\text{reference value}|$ between the output signal $S_{afs}$ of the air flow sensor 14 and the fresh air quantity reference value is derived as X ($|S_{afs}-\text{reference value}|=X$). Namely, if the air flow sensor 14 is functioning normally, its output signal $S_{afs}$ should coincide with the fresh air quantity reference value. In the event the output signal $S_{afs}$ differs from the fresh air quantity reference value, the difference is derived as X in this step.

Then, in Step S24, it is determined whether or not the difference X has a value larger than or equal to a predetermined value $X_1$ (very small value) ($X \geq X_1$).

If the decision in Step S24 is affirmative (Yes) and it is judged that the difference X is larger than or equal to the predetermined value $X_1$, it can be concluded that the air flow sensor 14 is not functioning normally and is in an abnormal state and that failure of the air flow sensor 14 has occurred (failure detecting means). In this case, therefore, it is ascertained in Step S26 that the difference X remains larger than or equal to the predetermined value $X_1$ for a predetermined time $t_1$, and in Step S28, the failure lamp 50 is turned on to notify the driver of the failure of the air flow sensor 14. Also, in Step S30, a failure code corresponding to the failure of the air flow sensor 14 is recorded in a memory within the ECU 40.

Since the fresh air quantity reference value, in particular, is set with high accuracy based on the proper target throttle valve opening just as in the case where the intake and exhaust throttle valves 12 and 22 are not operated, failure of the air flow sensor 14 can be detected with precision, regardless of the adjustment of the exhaust flow rate, and the reliability of the air flow sensor 14 can be improved. Thus, in cases where the output information from the air flow sensor 14 is used for controlling the regeneration of the after-treatment device 24, the regeneration can be controlled optimally, making it possible to further improve the exhaust gas characteristics.

If the decision in Step S24 is negative (No) and it is judged that the difference X is smaller than the predetermined value $X_1$ (very small value), it can be concluded that the air flow sensor 14 is functioning normally without failure, and thus the subsequent steps of the routine are not executed.

A second embodiment will be now described.

Figure 3:
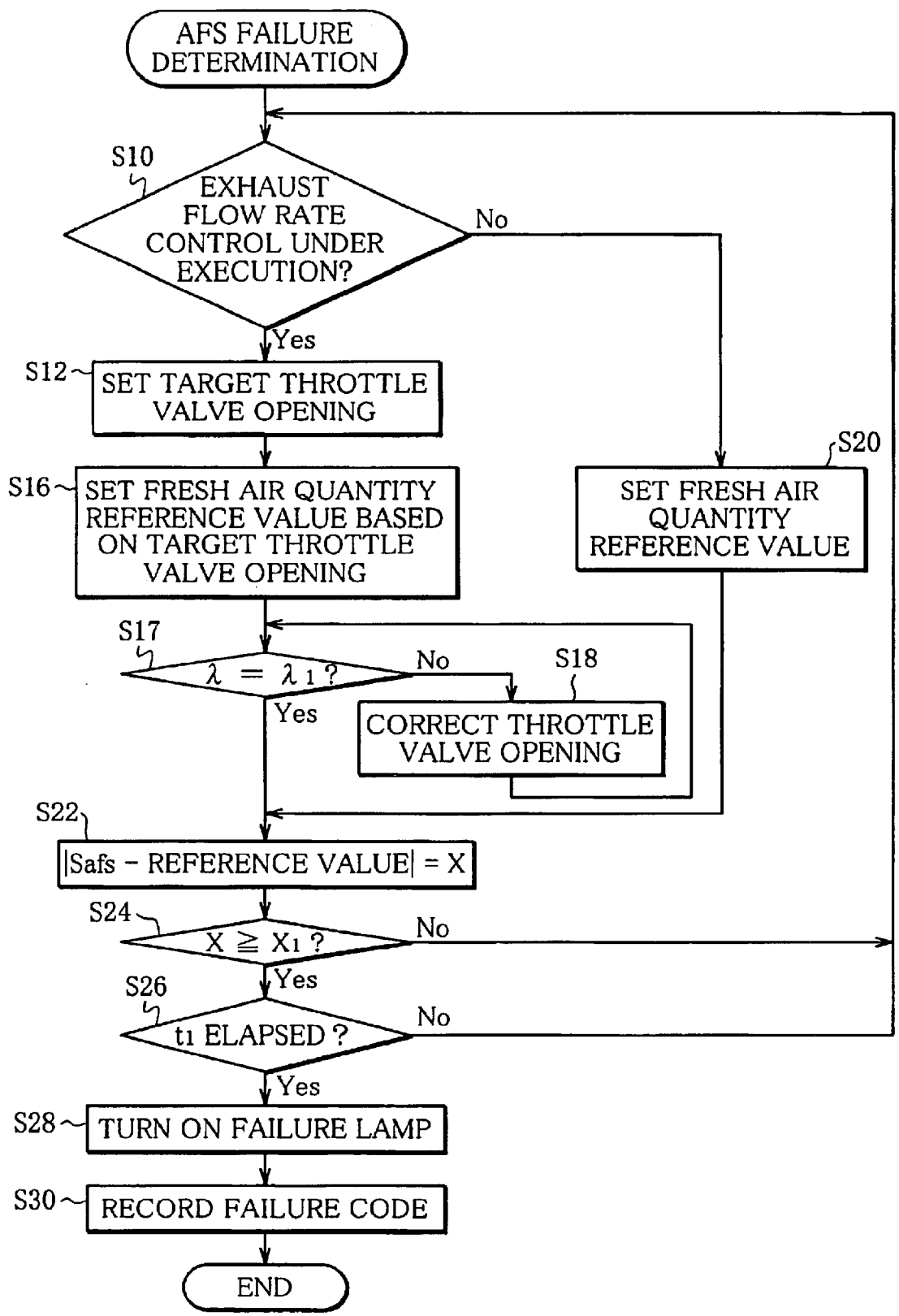
FIG. 3 is a flowchart illustrating another control routine for AFS failure determination according to a second embodiment of the present invention.

FIG. 3 is a flowchart illustrating a control routine for air flow sensor (AFS) failure determination, executed in the failure detection apparatus according to the second embodiment of the present invention. In the following description of the flowchart, only the differences between the first and second embodiments will be explained.

In the second embodiment, after the target throttle valve opening is set in Step S12, the fresh air quantity reference value is set immediately thereafter based on the target throttle valve opening in Step S16, without correcting the target throttle valve opening, unlike the first embodiment.

Then, in Step S17, it is determined whether or not the actual excess air ratio λ detected by the λ sensor 26 is equal to the target value $\lambda_1$ ($\lambda=\lambda_1$). In other words, it is determined whether or not a difference between the target value $\lambda_1$ and the actual excess air ratio λ has been caused due to an opening difference between the actual overall opening of the intake and exhaust throttle valves 12 and 22 and the target throttle valve opening.

If the decision in Step S17 is affirmative (Yes) and it is judged that the actual excess air ratio λ and the target value $\lambda_1$ are equal to each other, it can be concluded that the target throttle valve opening has been set to a proper value matching the actual overall opening of the intake and exhaust throttle valves 12 and 22, and accordingly, the routine proceeds to Step S22.

On the other hand, if the decision in Step S17 is negative (No) and it is judged that the actual excess air ratio λ and the target value $\lambda_1$ differ from each other, the overall opening of the intake and exhaust throttle valves 12 and 22 is corrected, in Step S18, such that the actual excess air ratio λ becomes equal to the target value $\lambda_1$.

Namely, in the first embodiment, the target throttle valve opening is corrected so as to match the actual overall opening of the intake and exhaust throttle valves 12 and 22. In the second embodiment, the actual overall opening of the intake and exhaust throttle valves 12 and 22 is corrected so as to match the target throttle valve opening.

Thus, the actual overall opening of the intake and exhaust throttle valves 12 and 22 is corrected to a proper value matching the target throttle valve opening, and accordingly, the fresh air quantity reference value can be set to a highly accurate value as in the case where the intake and exhaust throttle valves 12 and 22 are not operated.

Consequently, failure of the air flow sensor 14 can be detected with precision, regardless of the adjustment of the exhaust flow rate, and the reliability of the air flow sensor 14 can be improved. In cases where the information from the air flow sensor 14 is used for controlling the regeneration of the after-treatment device 24, therefore, the regeneration can be controlled optimally, making it possible to further improve the exhaust gas characteristics.

A third embodiment will be now described.

Figure 4:
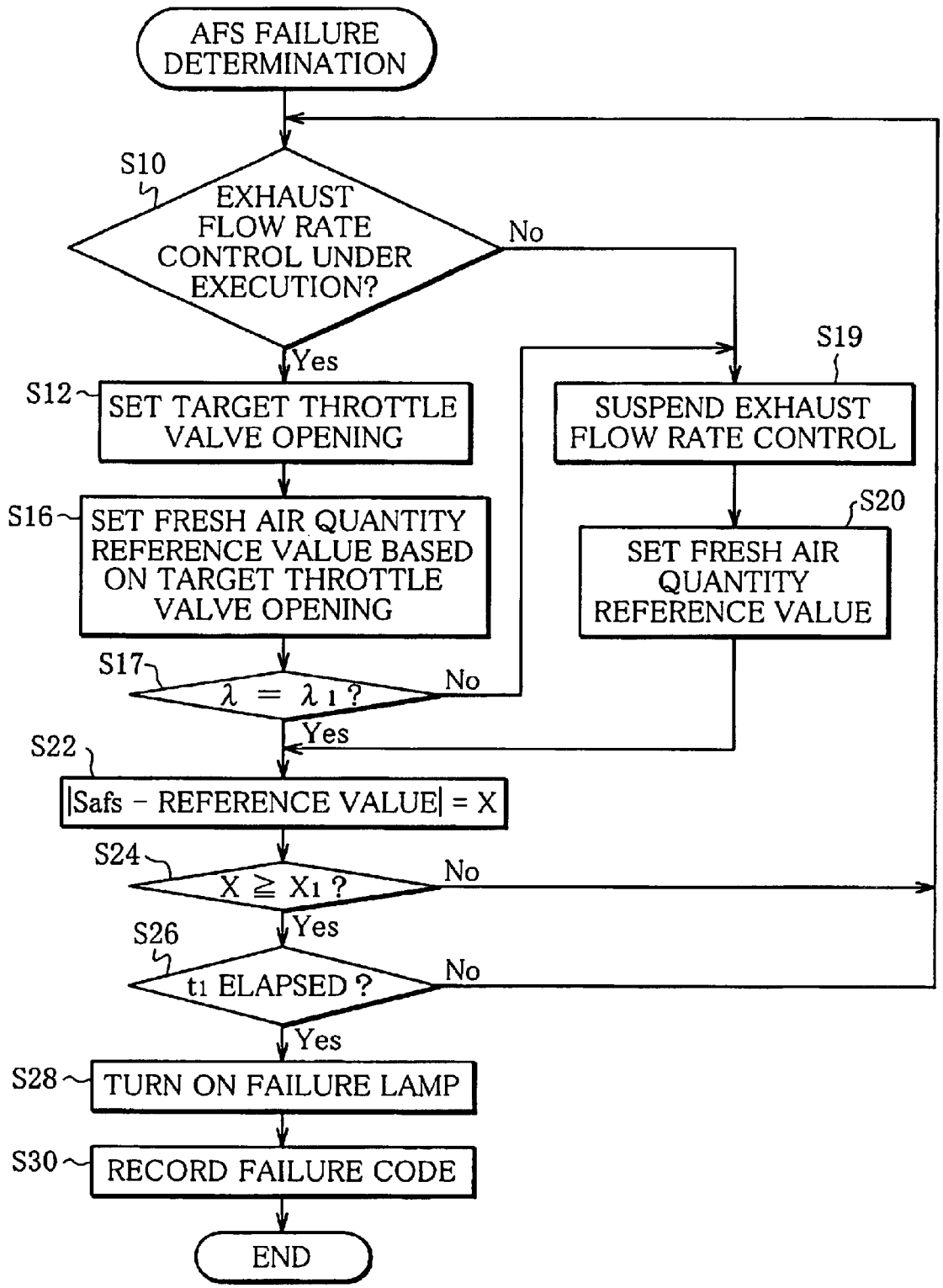
FIG. 4 is a flowchart illustrating still another control routine for AFS failure determination according to a third embodiment of the present invention.

FIG. 4 is a flowchart illustrating a control routine for air flow sensor (AFS) failure-determination, executed in the failure detection apparatus according to the third embodiment of the present invention. In the following description of the flowchart, only the differences between the third embodiment and the first or second embodiment will be explained.

In the third embodiment, after the target throttle valve opening is set in Step S12, the fresh air quantity reference value is set immediately thereafter based on the target throttle valve opening in Step S16, like the second embodiment.

Then, in Step S17, it is determined whether or not the actual excess air ratio λ detected by the λ sensor 26 is equal to the target value $\lambda_1$ ($\lambda=\lambda_1$), as in the second embodiment.

If the decision in Step S17 is affirmative (Yes) and it is judged that the actual excess air ratio λ and the target value $\lambda_1$ are equal to each other, it can be concluded that the target throttle valve opening has been set to a proper value matching the actual overall opening of the intake and exhaust throttle valves 12 and 22, and accordingly, the routine proceeds to Step S22.

On the other hand, if the decision in Step S17 is negative (No) and it is judged that the actual excess air ratio λ and the target value $\lambda_1$ differ from each other, the exhaust flow rate control is suspended in Step S19, then a normally obtained fresh air quantity $Q_a$ is directly set as the fresh air quantity reference value in Step S20, and the routine proceeds to Step S22.

Namely, in the third embodiment, if there is a difference between the actual excess air ratio λ and the target value $\lambda_1$, it is concluded that the fresh air quantity reference value cannot be set with accuracy, and the exhaust flow rate control itself is suspended. Thus, using the fresh air quantity $Q_a$ obtained normally in accordance with the operating state of the engine 1 as the fresh air quantity reference value, the air flow sensor 14 is diagnosed, without adjusting the exhaust flow rate.

In this case, the diagnosis of the air flow sensor 14 is not suspended but is continuously performed even while the exhaust flow rate control is suspended, whereby the occasion for diagnosis is not reduced.

Consequently, the fresh air quantity reference value can always be set to an accurate value, regardless of the degree to which the exhaust flow rate is adjusted. Thus, failure of the air flow sensor 14 can be detected with precision, making it possible to improve the reliability of the air flow sensor 14.

Fourth to sixth embodiments will be now described.

In the fourth to sixth embodiments, failure of the air flow sensor is determined taking account of not only the exhaust flow rate control, as in the first to third embodiments described above, but also EGR control. The fourth to sixth embodiments correspond to the first to third embodiments, respectively.

Figure 5:
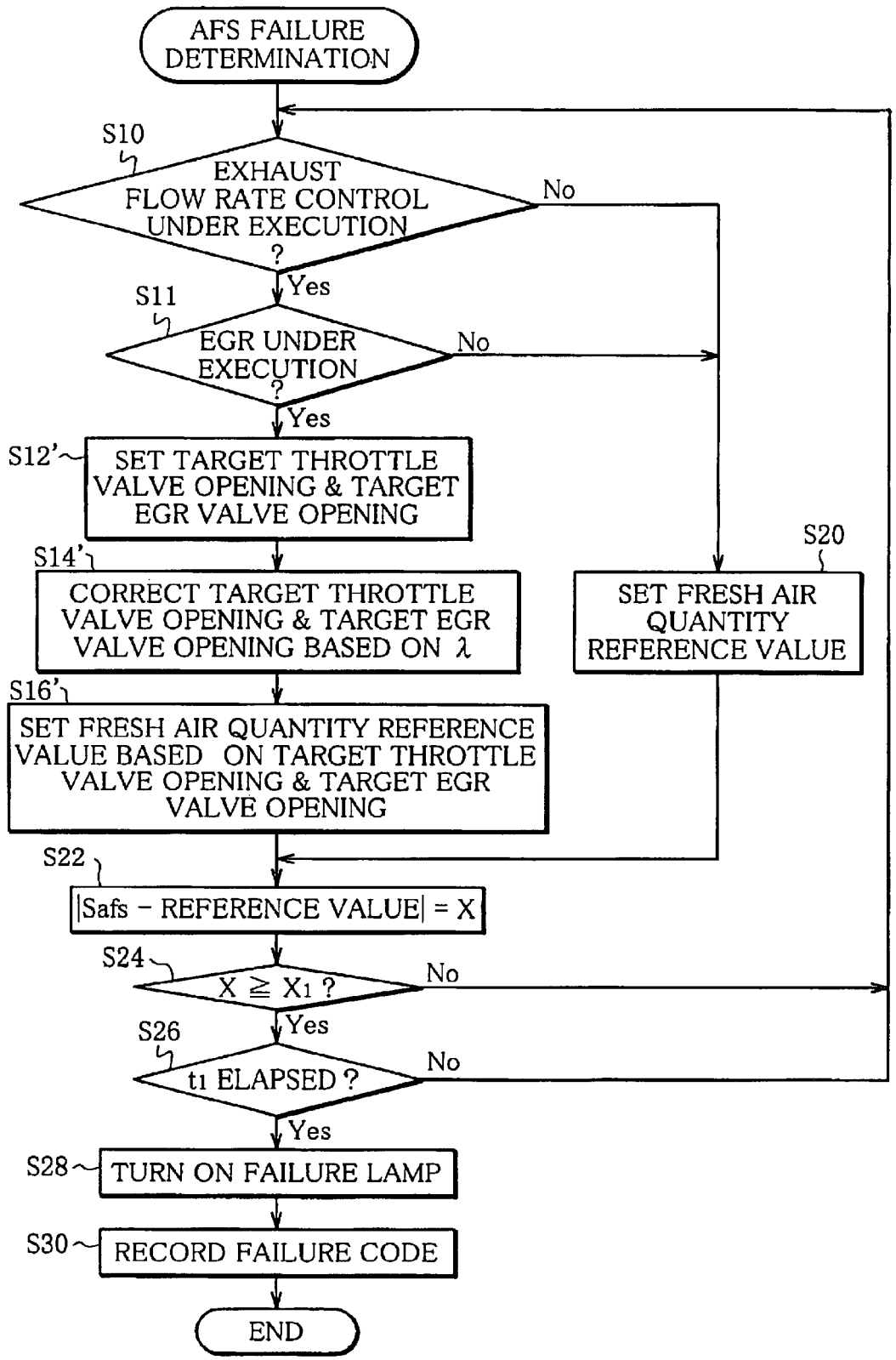
FIG. 5 is a flowchart illustrating yet another control routine for AFS failure determination according to a fourth embodiment of the present invention.

FIG. 5 is a flowchart illustrating a control routine for air flow sensor (AFS) failure determination, executed in the failure detection apparatus according to the fourth embodiment of the present invention. In the following description of the flowchart, only the differences between the fourth and first embodiments will be explained.

First, in Step S10, it is determined whether or not the exhaust flow rate control is under execution, that is, whether or not the exhaust flow rate is being adjusted by controlling the opening of one or both of the intake and exhaust throttle valves 12 and 22 toward the closed position, as in the foregoing embodiments. If the decision in this step is affirmative (Yes) and thus the exhaust flow rate control is under execution, the routine proceeds to Step S11.

In Step S11, it is determined whether or not the EGR is under execution, that is, whether or not the EGR valve 32 is opened to introduce the EGR gas into the intake system while the exhaust flow rate control is performed. If the decision in this step is affirmative (Yes) and thus the EGR is under execution, the routine proceeds to Step S12'.

In Step S12' are set a target throttle valve opening for the intake and exhaust throttle valves 12 and 22 as a whole and a target EGR valve opening for the EGR valve 32. In this instance, the target throttle valve opening (target adjustment amount) is set (target adjustment setting means) in accordance with the temperature (cooling water temperature etc.) of the engine 1, as mentioned above, and the target EGR valve opening is set (target opening setting means) in accordance with the engine speed $N_e$ and the fuel injection quantity $Q_f$.

Usually, the target value (predetermined value) $\lambda_1$ for the excess air ratio $\lambda$ is set in accordance with the operating state of the engine 1, and as the openings of the intake and exhaust throttle valves 12 and 22 change, the exhaust gas or EGR gas is recirculated into the combustion chamber 2, as mentioned above, with the result that the excess air ratio $\lambda$ varies depending on the EGR quantity. Accordingly, the fuel injection quantity $Q_f$ also is controlled in accordance with the target throttle valve opening so that the excess air ratio $\lambda$ may be kept at the target value $\lambda_1$. In other words, the target throttle valve opening is set while controlling the excess air ratio $\lambda$ to the target value $\lambda_1$. In practice, the fuel injection quantity $Q_f$ is read from the map prepared beforehand, as mentioned above.

Also, as the target value $\lambda_1$, changes, the quantity of the EGR gas introduced, that is, the target EGR valve opening, also changes with relation to the opening of the intake throttle valve 12 and the fuel injection quantity $Q_f$. Accordingly, the target EGR valve opening is set also based on the target value $\lambda_1$ for the excess air ratio $\lambda$. In practice, a map showing the relationship of the target EGR valve opening with the engine speed $N_e$, fuel injection quantity $Q_f$ and target value $\lambda_1$ is prepared beforehand by experiment, and an appropriate target EGR valve opening is read from the map.

In Step S14', the target throttle valve opening and target EGR valve opening set in the aforementioned manner are corrected based on an actual excess air ratio $\lambda$ detected by the $\lambda$ sensor 26. The target throttle valve opening and the target EGR valve opening are merely command values from the ECU 40 and are not actual values. Thus, even if the overall opening of the intake and exhaust throttle valves 12 and 22 is controlled so as to coincide with the target throttle valve opening corresponding to the target value $\lambda_1$ and also the opening of the EGR valve 32 is controlled so as to coincide with the target EGR valve opening corresponding to the target value $\lambda_1$, a difference can occasionally arise between the actual overall opening of the intake and exhaust throttle valves 12 and 22 and the target throttle valve opening or between the actual opening of the EGR valve 32 and the target EGR valve opening. Such an opening difference causes a similar difference between the target value $\lambda_1$ and the actual excess air ratio $\lambda$. Accordingly, the target value $\lambda_1$ is compared with the actual excess air ratio $\lambda$, and based on the result of comparison, the target throttle valve opening and the target EGR valve opening are corrected so as to match their actual openings.

Specifically, a difference (absolute value) $|\lambda-\lambda_1|$ between the target value $\lambda_1$ and the actual excess air ratio $\lambda$ detected by the $\lambda$ sensor 26 is obtained, and the target throttle valve opening and the target EGR valve opening are corrected by an amount corresponding to the difference. In this case, the target throttle valve opening and the target EGR valve opening may be corrected as a whole based on the difference $|\lambda-\lambda_1|$.

In Step S16', a reference value for the fresh air quantity $Q_a$, that is, the fresh air quantity reference value, is set (fresh air quantity reference value setting means) in accordance with the target throttle valve opening and target EGR valve opening obtained as described above. Basically, the reference value for the fresh air quantity $Q_a$, or the fresh air quantity reference value, is set in accordance with the operating state (engine speed $N_e$, fuel injection quantity $Q_f$, engine torque, throttle opening, manifold air pressure, etc.) of the engine 1. In this step, the fresh air quantity reference value thus set is corrected by using the target throttle valve opening and the target EGR valve opening. In practice, a map showing the relationship between fresh air quantity $Q_a'$ applicable during the exhaust flow rate control and the target throttle valve opening is prepared beforehand, a difference $(Q_a'-Q_{egr})$ between the fresh air quantity $Q_a'$ read from the map and an EGR gas quantity $Q_{egr}$ corresponding to the target EGR valve opening is obtained, and a reference value corresponding to the difference $(Q_a'-Q_{egr})$ is set as the fresh air quantity reference value. Alternatively, the reference value for the fresh air quantity $Q_a'$ not including the EGR gas may be corrected by using a value corresponding to the target EGR valve opening.

Since the target throttle valve opening and the target EGR valve opening have been corrected as a whole to proper values matching the actual openings of the intake and exhaust throttle valves 12 and 22 and EGR valve 32, as mentioned above, the fresh air quantity reference value can be set to a highly accurate value as in the case where the exhaust flow rate is not adjusted or the EGR gas is not introduced.

If the decision in Step S10 is negative (No) and it is judged that the exhaust flow rate control is not under execution, or if the decision in Step S11 is negative (No) and it is judged that no EGR gas is being introduced into the intake system, the routine proceeds to Step S20.

In this case, a fresh air quantity $Q_a$ normally obtained in accordance with the operating state of the engine 1 is set directly as the fresh air quantity reference value, without regard to the target throttle valve opening or the target EGR valve opening.

Then, in Step S22, a difference (absolute value) $|S_{afs}-$reference value| between the output signal $S_{afs}$ of the air flow sensor 14 and the fresh air quantity reference value is derived as X ($|S_{afs}-$reference value$|$=X), like the foregoing embodiments. Subsequently, in Step S24, it is determined whether or not the difference X has a value larger than or equal to the predetermined value $X_1$ (very small value) ($X \geq X_1$). If the decision in this step is affirmative (Yes) and it is judged that the difference X is larger than or equal to the predetermined value $X_1$, it is concluded that failure of the air flow sensor 14 has occurred (failure detecting means), and the failure lamp 50 is turned on, in Step S28, to notify the driver of the failure of the air flow sensor 14. Also, in Step S30, the failure code corresponding to the failure of the air flow sensor 14 is recorded in memory within the ECU 40.

Thus, even while the exhaust flow rate control is performed and at the same time the EGR gas is introduced into the intake system, failure of the air flow sensor 14 can be detected with high accuracy, as in the first to third embodiments described above, whereby the reliability of the air flow sensor 14 can be improved.

Figure 6:
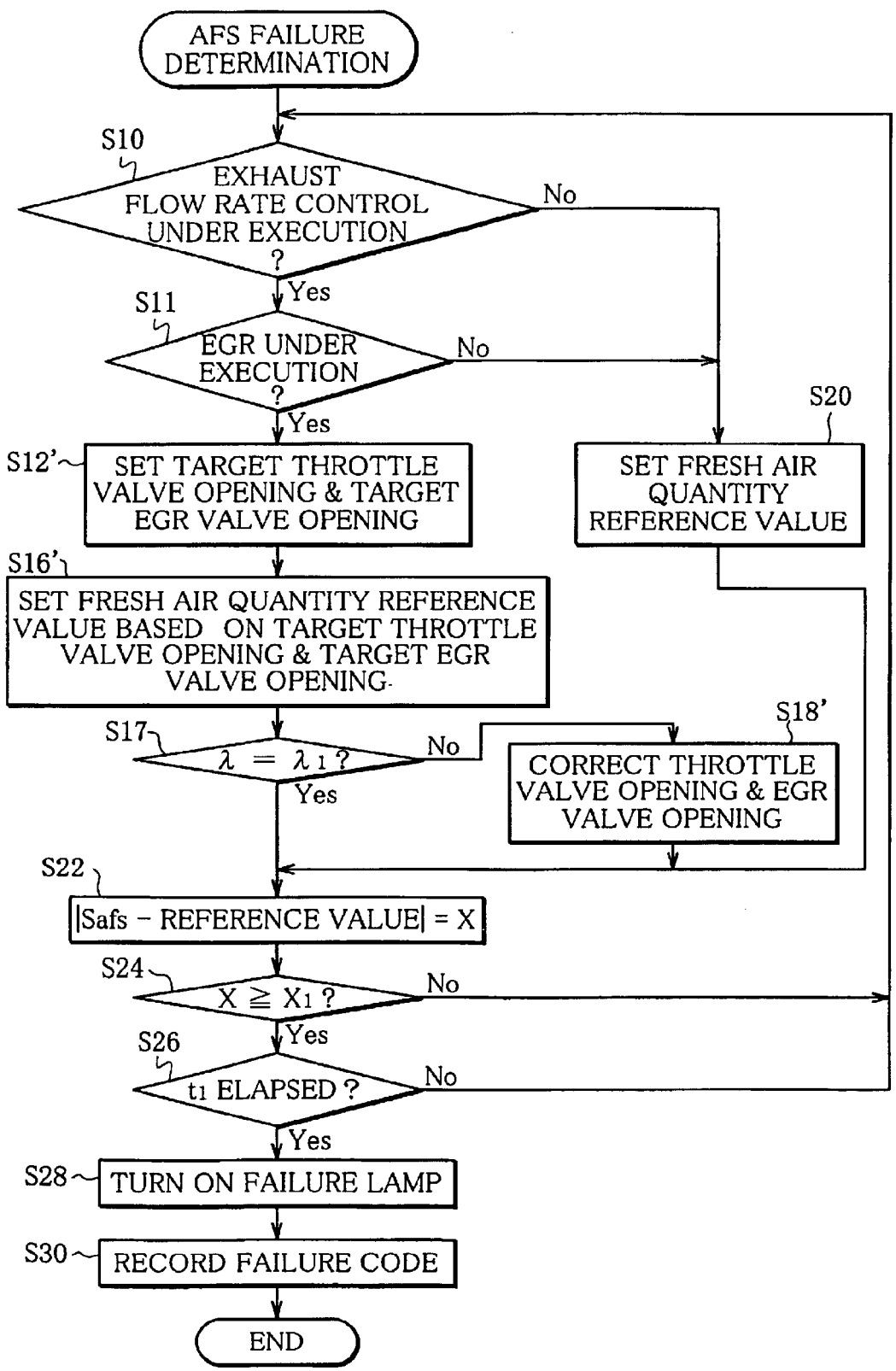
FIG. 6 is a flowchart illustrating a further control routine for AFS failure determination according to a fifth embodiment of the present invention.

FIG. 6 is a flowchart illustrating a control routine for air flow sensor (AFS) failure determination, executed in the failure detection apparatus according to the fifth embodiment of the present invention. In the following description of the flowchart, only the differences between the fourth and fifth embodiments will be explained.

In the fifth embodiment, after the target throttle valve opening and the target EGR valve opening are set in Step S12', the fresh air quantity reference value is set immediately thereafter based on the target throttle valve opening and the target EGR valve opening, in Step S16', without correcting the target openings, unlike the fourth embodiment.

Then, in Step S17, it is determined whether or not the actual excess air ratio λ detected by the λ sensor 26 is equal to the target value $\lambda_1$ ($\lambda = \lambda_1$). If the decision in this step is affirmative (Yes) and it is judged that the actual excess air ratio λ and the target value $\lambda_1$ are equal to each other, it can be concluded that the target throttle valve opening and the target EGR valve opening have been set to proper values matching their actual openings, and accordingly, the routine proceeds to Step S22.

On the other hand, if the decision in Step S17 is negative (No) and it is judged that the actual excess air ratio λ and the target value $\lambda_1$ differ from each other, the overall opening of the intake and exhaust throttle valves 12 and 22 and the opening of the EGR valve 32 are corrected, in Step S18', such that the actual excess air ratio λ becomes equal to the target value $\lambda_1$.

Namely, in the fourth embodiment, the target throttle valve opening and the target EGR valve opening are corrected so as to match their actual openings. In the fifth embodiment, the actual overall opening of the intake and exhaust throttle valves 12 and 22 and the actual opening of the EGR valve 32 are corrected so as to match their target openings.

Thus, the actual overall opening of the intake and exhaust throttle valves 12 and 22 and the actual opening of the EGR valve 32 are corrected to proper values matching their target openings, and accordingly, the fresh air quantity reference value can be set to a highly accurate value as in the case where the exhaust flow rate is not adjusted or the EGR gas is not introduced.

Consequently, failure of the air flow sensor 14 can be detected with precision, regardless of the exhaust flow rate adjustment or the EGR gas introduction, so that the reliability of the air flow sensor 14 can be improved.

Figure 7:
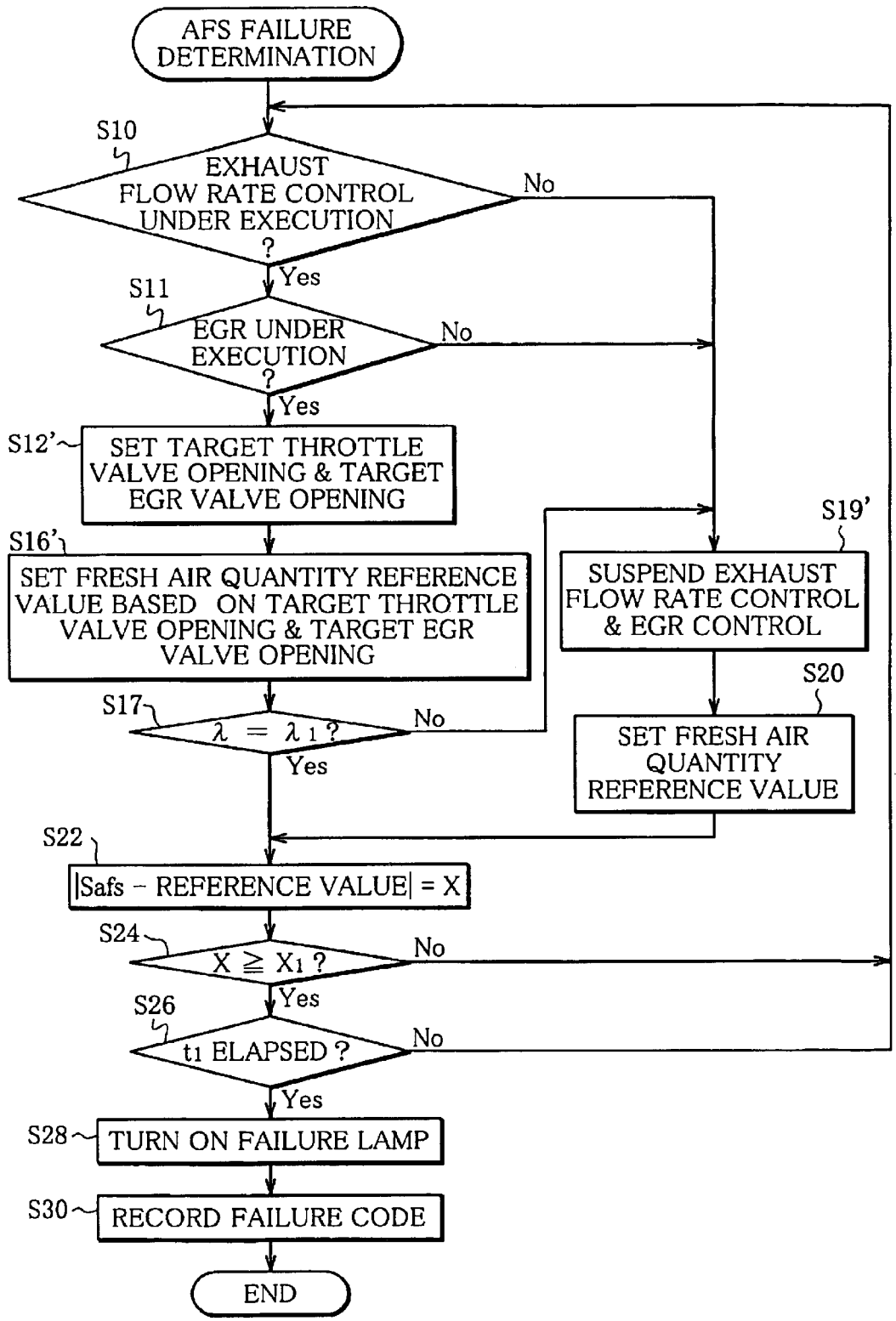
FIG. 7 is a flowchart illustrating a still further control routine for AFS failure determination according to a sixth embodiment of the present invention.

FIG. 7 is a flowchart illustrating a control routine for air flow sensor (AFS) failure determination, executed in the failure detection apparatus according to the sixth embodiment of the present invention. In the following description of the flowchart, only the differences between the sixth embodiment and the fourth or fifth embodiment will be explained.

In the sixth embodiment, after the target throttle valve opening and the target EGR valve opening are set in Step S12', the fresh air quantity reference value is set immediately thereafter based on the target throttle valve opening and the target EGR valve opening in Step S16', like the fifth embodiment.

Then, in Step S17, it is determined whether or not the actual excess air ratio λ detected by the λ sensor 26 is equal to the target value $\lambda_1$ ($\lambda = \lambda_1$). If the decision in this step is affirmative (Yes) and it is judged that the actual excess air ratio λ and the target value $\lambda_1$ are equal to each other, it can be concluded that the target throttle valve opening and the target EGR valve opening have been set to proper values matching their actual openings, and accordingly, the routine proceeds to Step S22.

On the other hand, if the decision in Step S17 is negative (No) and it is judged that the actual excess air ratio λ and the target value $\lambda_1$ differ from each other, the exhaust flow rate control and the EGR control are suspended in Step S19', then a normally obtained fresh air quantity $Q_a$ is directly set as the fresh air quantity reference value in Step S20, and the routine proceeds to Step S22.

Namely, in the sixth embodiment, if there is a difference between the actual excess air ratio λ and the target value $\lambda_1$, it is concluded that the fresh air quantity reference value cannot be set with accuracy, and the exhaust flow rate control and the EGR control are suspended. Thus, using the fresh air quantity $Q_a$ obtained normally in accordance with the operating state of the engine 1 as the fresh air quantity reference value, the air flow sensor 14 is diagnosed, without adjusting the exhaust flow rate or introducing the EGR gas.

This permits the fresh air quantity reference value to be always set to an accurate value, without reducing the occasion for diagnosis and regardless of the degree to which the exhaust flow rate is adjusted or to which the EGR gas is introduced. Also in this case, therefore, failure of the air flow sensor 14 can be detected with precision, making it possible to improve the reliability of the air flow sensor 14.

While the preferred embodiments of the present invention have been described, it should be noted that the present invention is not limited to the foregoing embodiments alone.

For example, in the foregoing embodiments, the λ sensor ($O_2$ sensor etc.) 26 is used as the exhaust concentration detecting means and the excess air ratio λ or air-fuel ratio of the exhaust system, which is detected by the λ sensor 26, is compared with the target value (predetermined value) $\lambda_1$. The present invention is, however, not limited to such configuration and may be provided with a means for detecting the concentration of gas flowing into the combustion chamber 2 so that the detected gas concentration may be compared with a predetermined value.

Also, in the foregoing embodiments, both the intake throttle valve 12 and the exhaust throttle valve 22 are provided as the exhaust flow rate adjusting means, but the exhaust flow rate adjusting means may be constituted by either one of the intake and exhaust throttle valves 12 and 22.

Further, although in the foregoing embodiments, a diesel engine is used as the engine 1, the engine 1 may alternatively be a gasoline engine.

What is claimed is:

1. A failure detection apparatus for an internal combustion engine, comprising:
fresh air quantity detecting means arranged in an intake system of the engine, for detecting a quantity of fresh air introduced into a combustion chamber of the engine;

fresh air quantity reference value setting means for setting a reference value for the fresh air quantity in accordance with an operating state of the engine;

failure detecting means for detecting abnormality of said fresh air quantity detecting means, based on a result of comparison between the fresh air quantity detected by said fresh air quantity detecting means and the reference value set by said fresh air quantity reference value setting means;

exhaust flow rate adjusting means arranged in at least one of the intake system and exhaust system of the engine, for adjusting an exhaust flow rate;

target adjustment setting means for setting a target adjustment amount for said exhaust flow rate adjusting means in accordance with the operating state of the engine such that an air-fuel ratio or excess air ratio of the exhaust system becomes equal to a predetermined value corresponding to the operating state; and exhaust flow rate control means for controlling said exhaust flow rate adjusting means in accordance with the target adjustment amount set by said target adjustment setting means, wherein said fresh air quantity reference value setting means sets the reference value in accordance with not only the operating state of the engine but also the target adjustment amount set for said exhaust flow rate adjusting means by said target adjustment setting means.

2. The failure detection apparatus according to claim 1, wherein said exhaust flow rate adjusting means includes at least one of an intake throttle valve arranged in the intake system for adjusting the fresh air quantity and an exhaust throttle valve arranged in the exhaust system for directly adjusting the exhaust flow rate, and said fresh air quantity reference value setting means sets the reference value in accordance with not only the operating state of the engine but also a target valve opening set for said at least one of the intake and exhaust throttle valves by said target adjustment setting means.

3. The failure detection apparatus according to claim 1, further comprising exhaust concentration detecting means for detecting an exhaust concentration to thereby detect the air-fuel ratio or excess air ratio of the exhaust system, wherein said fresh air quantity reference value setting means corrects the target adjustment amount for said exhaust flow rate adjusting means, based on a difference between the air-fuel ratio or excess air ratio of the exhaust system, detected by said exhaust concentration detecting means, and the predetermined value, and sets the reference value based on the corrected target adjustment amount.

4. The failure detection apparatus according to claim 1, further comprising exhaust concentration detecting means for detecting an exhaust concentration to thereby detect the air-fuel ratio or excess air ratio of the exhaust system, wherein said exhaust flow rate control means corrects an amount of adjustment by said exhaust flow rate adjusting means such that the air-fuel ratio or excess air ratio of the exhaust system, detected by said exhaust concentration detecting means, coincides with the predetermined value.

5. The failure detection apparatus according to claim 1, further comprising exhaust concentration detecting means for detecting an exhaust concentration to thereby detect the air-fuel ratio or excess air ratio of the exhaust system, wherein, when the air-fuel ratio or excess air ratio of the exhaust system, detected by said exhaust concentration detecting means, is different from the predetermined value, said fresh air quantity reference value setting means suspends the control of said exhaust flow rate adjusting means by said exhaust flow rate control means and sets the reference value based solely on the operating state of the engine.

6. A failure detection apparatus for an internal combustion engine, comprising:

fresh air quantity detecting: means arranged in an intake system of the engine, for detecting a quantity of fresh air introduced into a combustion chamber of the engine;

fresh air quantity reference value setting means for setting a reference value for the fresh air quantity in accordance with an operating state of the engine;

failure detecting means for detecting abnormality of said fresh air quantity detecting means, based on a result of comparison between the fresh air quantity detected by said fresh air quantity detecting means and the reference value set by said fresh air quantity reference value setting means;

exhaust flow rate adjusting means arranged in one of the intake system and exhaust system of the engine, for adjusting an exhaust flow rate;

target adjustment setting means for setting a target adjustment amount for said exhaust flow rate adjusting means in accordance with the operating state of the engine such that an air-fuel ratio or excess air ratio of the exhaust system becomes equal to a predetermined value corresponding to the operating state;

exhaust flow rate control means for controlling said exhaust flow rate adjusting means in accordance with the target adjustment amount set by said target adjustment setting means;

an EGR passage for allowing part of exhaust gas to be recirculated from the exhaust system of the engine to the intake system as EGR gas;

an EGR valve inserted in said EGR passage, for controlling a quantity of the EGR gas by varying an opening thereof;

target opening setting means for setting a target EGR valve opening for said EGR valve in accordance with the operating state of the engine such that the air-fuel ratio or excess air ratio of the exhaust system becomes equal to the predetermined value; and EGR valve control means for controlling said EGR valve in accordance with the target EGR valve opening set by said target opening setting means, wherein said fresh air quantity reference value setting means sets the reference value in accordance with not only the operating state of the engine but also the target adjustment amount set for said exhaust flow rate adjusting means by said target adjustment setting means and the target EGR valve opening set by said target opening setting means.

7. The failure detection apparatus according to claim 6, wherein said exhaust flow rate adjusting means includes at least one of an intake throttle valve arranged in the intake system for adjusting the fresh air quantity and an exhaust throttle valve arranged in the exhaust system for directly adjusting the exhaust flow rate, and said fresh air quantity reference value setting means sets the reference value in accordance with not only the operating state of the engine but also a target valve opening set for said at least one of the intake and exhaust throttle valves by said target adjustment setting means and the target EGR valve opening set by said target opening setting means.

8. The failure detection apparatus according to claim 6, further comprising exhaust concentration detecting means for detecting an exhaust concentration to thereby detect the air-fuel ratio or excess air ratio of the exhaust system, wherein said fresh air quantity reference value setting means corrects at least one of the target adjustment amount and the target EGR valve opening based on a difference between the air-fuel ratio or excess air ratio of the exhaust system, detected by said exhaust concentration detecting means, and the predetermined value, and sets the reference value based on said at least one of the corrected target adjustment amount and the corrected target EGR valve opening.

9. The failure detection apparatus according to claim 6, further comprising exhaust concentration detecting means for detecting an exhaust concentration to thereby detect the air-fuel ratio or excess air ratio of the exhaust system, wherein said exhaust flow rate control means corrects an amount of adjustment by said exhaust flow rate adjusting means such that the air-fuel ratio or excess air ratio of the exhaust system, detected by said exhaust concentration detecting means, coincides with the predetermined value, and said EGR valve control means corrects the opening of said EGR valve such that the air-fuel ratio or excess air ratio of the exhaust system, detected by said exhaust concentration detecting means, coincides with the predetermined value.

10. The failure detection apparatus according to claim 6, further comprising exhaust concentration detecting means for detecting an exhaust concentration to thereby detect the air-fuel ratio or excess air ratio of the exhaust system, wherein, when the air-fuel ratio or excess air ratio of the exhaust system, detected by said exhaust concentration detecting means, is different from the predetermined value, said fresh air quantity reference value setting means suspends the control of said exhaust flow rate adjusting means by said exhaust flow rate control means as well as the control of said EGR valve by said EGR valve control means and sets the reference value based solely on the operating state of the engine.

11. A failure detection method implemented by a failure detection apparatus for an internal combustion engine, the failure detection apparatus including fresh air quantity detecting means for detecting a quantity of fresh air introduced into a combustion chamber of the engine and exhaust flow rate adjusting means for adjusting an exhaust flow rate in at least one of intake and exhaust systems of the engine, said failure detection method comprising:

a target adjustment setting step of setting a target adjustment amount for the exhaust flow rate adjusting means in accordance with an operating state of the engine such that an air-fuel ratio or excess air ratio of the exhaust system becomes equal to a predetermined value corresponding to the operating state;

an exhaust flow rate control step of controlling the exhaust flow rate adjusting means in accordance with the target adjustment amount set in said target adjustment setting step;

a fresh air quantity reference value setting step of setting a reference value for the fresh air quantity in accordance with the operating state of the engine and the target adjustment amount set for the exhaust flow rate adjusting means in said target adjustment setting step; and a failure detecting step of detecting abnormality of the fresh air quantity detecting means, based on a result of comparison between the fresh air quantity detected by the fresh air quantity detecting means and the reference value set in said fresh air quantity reference value setting step.

12. The failure detection method according to claim 11, wherein said exhaust flow rate adjusting means includes at least one of an intake throttle valve arranged in the intake system for adjusting the fresh air quantity and an exhaust throttle valve arranged in the exhaust system for directly adjusting the exhaust flow rate, and said fresh air quantity reference value setting step comprises setting the reference value in accordance with not only the operating state of the engine but also a target valve opening set for said at least one of the intake and exhaust throttle valves in said target adjustment setting step.

13. The failure detection method according to claim 11, wherein said failure detection apparatus further includes exhaust concentration detecting means for detecting an exhaust concentration to thereby detect the air-fuel ratio or excess air ratio of the exhaust system, and said fresh air quantity reference value setting step comprises correcting the target adjustment amount for the exhaust flow rate adjusting means based on a difference between the air-fuel ratio or excess air ratio of the exhaust system, detected by the exhaust concentration detecting means, and the predetermined value, and setting the reference value based on the corrected target adjustment amount.

14. The failure detection method according to claim 11, wherein said failure detection apparatus further includes exhaust concentration detecting means for detecting an exhaust concentration to thereby detect the air-fuel ratio or excess air ratio of the exhaust system, and said exhaust flow rate control step comprises correcting an amount of adjustment by the exhaust flow rate adjusting means such that the air-fuel ratio or excess air ratio of the exhaust system, detected by the exhaust concentration detecting means, coincides with the predetermined value.

15. The failure detection method according to claim 11, wherein said failure detection apparatus further includes exhaust concentration detecting means for detecting an exhaust concentration to thereby detect the air-fuel ratio or excess air ratio of the exhaust system, and if the air-fuel ratio or excess air ratio of the exhaust system, detected by the exhaust concentration detecting means, is different from the predetermined value, said fresh air quantity reference value setting step suspends the control of the exhaust flow rate adjusting means in said exhaust flow rate control step and sets the reference value based solely on the operating state of the engine.

16. A failure detection method implemented by a failure detection apparatus for an internal combustion engine, the failure detection apparatus including fresh air quantity detecting means for detecting a quantity of fresh air introduced into a combustion chamber of the engine, exhaust flow rate adjusting means for adjusting an exhaust flow rate in at least one of intake and exhaust systems of the engine, an EGR passage for allowing part of exhaust gas to be recirculated from the exhaust system of the engine to the intake system as EGR gas, and an EGR valve inserted in the EGR passage for controlling a quantity of the EGR gas by varying an opening thereof, said failure detection method comprising:

a target adjustment setting step of setting a target adjustment amount for the exhaust flow rate adjusting means in accordance with an operating state of the engine such that an air-fuel ratio or excess air ratio of the exhaust system becomes equal to a predetermined value corresponding to the operating state;

an exhaust flow rate control step of controlling the exhaust flow rate adjusting means in accordance with the target adjustment amount set in said target adjustment setting step;

a target opening setting step of setting a target EGR valve opening for the EGR valve in accordance with the operating state of the engine such that the air-fuel ratio or excess air ratio of the exhaust system becomes equal to the predetermined value;

an EGR valve control step of controlling the EGR valve in accordance with the target EGR valve opening set in said target opening setting step;

a fresh air quantity reference value setting step of setting a reference value for the fresh air quantity in accordance with the operating state of the engine, the target adjustment amount set for the exhaust flow rate adjusting means in said target adjustment setting step, and the target EGR valve opening set in said target opening setting step; and a failure detecting step of detecting abnormality of the fresh air quantity detecting means, based on a result of comparison between the fresh air quantity detected by the fresh air quantity detecting means and the reference value set in said fresh air quantity reference value setting step.

17. The failure detection method according to claim 16, wherein the exhaust flow rate adjusting means includes at least one of an intake throttle valve arranged in the intake system for adjusting the fresh air quantity and an exhaust throttle valve arranged in the exhaust system for directly adjusting the exhaust flow rate, and said fresh air quantity reference value setting step comprises setting the reference value in accordance with not only the operating state of the engine but also a target valve opening set for said at least one of the intake and exhaust throttle valves in said target adjustment setting step and the target EGR valve opening set in said target opening setting step.

18. The failure detection method according to claim 16, wherein said failure detection apparatus further includes exhaust concentration detecting means for detecting an exhaust concentration to thereby detect the air-fuel ratio or excess air ratio of the exhaust system, and said fresh air quantity reference value setting step comprises correcting at least one of the target adjustment amount and the target EGR valve opening based on a difference between the air-fuel ratio or excess air ratio of the exhaust system, detected by the exhaust concentration detecting means, and the predetermined value, and setting the reference value based on said at least one of the corrected target adjustment amount and the corrected target EGR valve opening.

19. The failure detection method according to claim 16, wherein said failure detection apparatus further includes exhaust concentration detecting means for detecting an exhaust concentration to thereby detect the air-fuel ratio or excess air ratio of the exhaust system, said exhaust flow rate control step comprises correcting an amount of adjustment by the exhaust flow rate adjusting means such that the air-fuel ratio or excess air ratio of the exhaust system, detected by the exhaust concentration detecting means, coincides with the predetermined value, and said EGR valve control step comprises correcting the opening of the EGR valve such that the air-fuel ratio or excess air ratio of the exhaust system, detected by the exhaust concentration detecting means, coincides with the predetermined value.

20. The failure detection method according to claim 16, wherein said failure detection apparatus further includes exhaust concentration detecting means for detecting an exhaust concentration to thereby detect the air-fuel ratio or excess air ratio of the exhaust system, and if the air-fuel ratio or excess air ratio of the exhaust system, detected by the exhaust concentration detecting means, is different from the predetermined value, said fresh air quantity reference value setting step suspends the control of the exhaust flow rate adjusting means in said exhaust flow rate control step as well as the control of the EGR valve in said EGR valve control step and sets the reference value based solely on the operating state of the engine.

* * * * *

UNITED STATES PATENT AND TRADEMARK OFFICE
CERTIFICATE OF CORRECTION

PATENT NO. : 6,962,145 B2
DATED : November 8, 2005
INVENTOR(S) : Yoshiyuki Akao et al.

It is certified that error appears in the above-identified patent and that said Letters Patent is hereby corrected as shown below:

<u>Title page,</u>
Item [21], Application No., should be -- 10/655,578. --.
Item [22], Filing Date, should be -- September 4, 2003. --.

Signed and Sealed this

Thirty-first Day of January, 2006

JON W. DUDAS
*Director of the United States Patent and Trademark Office*